US006656366B1

(12) United States Patent
Fung et al.

(10) Patent No.: US 6,656,366 B1
(45) Date of Patent: Dec. 2, 2003

(54) METHOD FOR REDUCING SOLIDS BUILDUP IN HYDROCARBON STREAMS PRODUCED FROM WELLS

(75) Inventors: Gee Seng Fung, Houston, TX (US); Rajnikant M. Amin, Houston, TX (US); Bayram Kalpakci, The Woodlands, TX (US); Fouad Fleyfel, Houston, TX (US); James F. O'Sullivan, Houston, TX (US)

(73) Assignees: Halliburton Energy Services, Inc., Houston, TX (US); Kellogg Brown & Root, Inc., Houston, TX (US)

( * ) Notice: Subject to any disclaimer, the term of this patent is extended or adjusted under 35 U.S.C. 154(b) by 0 days.

(21) Appl. No.: 09/615,344

(22) Filed: Jul. 12, 2000

Related U.S. Application Data

(60) Provisional application No. 60/143,569, filed on Jul. 13, 1999, and provisional application No. 60/143,356, filed on Jul. 12, 1999.

(51) Int. Cl.[7] .............................. B01D 21/01
(52) U.S. Cl. .............................. 210/737; 210/194
(58) Field of Search .............................. 210/737, 194, 210/791, 805, 774, 196, 808, 407, 413

(56) References Cited

U.S. PATENT DOCUMENTS 3,773,650 A 11/1973 Hislop et al. ........ 208/33
3,775,288 A 11/1973 Eagen et al. ........ 208/33
3,776,248 A 12/1973 Titus ........ 137/13
3,972,779 A 8/1976 Harrison ........ 106/14.5
4,013,544 A 3/1977 Merrill, Jr. ........ 208/93
4,050,742 A 9/1977 Hughes ........ 302/66
4,058,907 A 11/1977 Lipp et al. ........ 34/61
4,267,043 A 5/1981 Benson ........ 210/241
4,319,962 A 3/1982 Ryan ........ 196/14.5
4,328,098 A 5/1982 Benson ........ 210/195.1
4,334,978 A 6/1982 Broadhurst ........ 208/33
4,441,987 A 4/1984 Broadhurst ........ 208/33
4,447,311 A 5/1984 Fowles et al. ........ 208/35
4,502,787 A 3/1985 Broadhurst ........ 36/149
4,697,426 A 10/1987 Knowles, Jr. ........ 62/48
4,702,758 A 10/1987 Geer ........ 62/532
4,728,413 A 3/1988 Broadhurst ........ 208/33
4,898,659 A 2/1990 Broadhurst ........ 208/33
5,284,581 A 2/1994 Benson ........ 210/194
5,286,376 A 2/1994 Benson ........ 210/194
5,427,680 A 6/1995 Benson ........ 210/194
5,676,848 A 10/1997 Benson ........ 210/791
5,888,407 A 3/1999 Benson ........ 210/791
6,070,417 A 6/2000 Benson ........ 62/71

*Primary Examiner*—Robert Popovics
(74) *Attorney, Agent, or Firm*—Conley Rose, P.C.

(57) ABSTRACT

An apparatus and method are provided for preventing or reducing buildup of certain solids in a system or a conduit containing or conveying a fluid. The fluid can be a single phase liquid, such as a liquid hydrocarbon, or a multiphase fluid such as a mixture of several immiscible liquids, for example liquid hydrocarbon and water, plus a gaseous phase that may include hydrocarbon vapors as well as other gases, for example carbon dioxide, hydrogen sulfide, etc. Preferably, the fluid is crude oil. The solids include all solids precipitating from fluids due to thermodynamically or chemical composition driven forces, as well as materials that can change phases. Preferably, the solids are solids typically dissolved in crude oil, such as higher paraffins, asphaltenes, hydrates, organic salts, and inorganic salts. The method involves passing the fluid through a treatment apparatus placed before the system or conduit under conditions sufficient to deposit the solids within the apparatus, slurrying the solids, and passing the resulting slurry to the system or conduit. The apparatus includes a passage having a length sufficient to effect substantially complete deposition of the solids.

17 Claims, 3 Drawing Sheets

METHOD FOR REDUCING SOLIDS BUILDUP IN HYDROCARBON STREAMS PRODUCED FROM WELLS

CROSS-REFERENCE TO RELATED APPLICATIONS

This application claims the benefit under 35 U.S.C. 119(e) of U.S. provisional patent application Serial No. 60/143,569, filed Jul. 13, 1999 and U.S. provisional patent application Serial No. 60/143,356, filed Jul. 12, 1999, each of which is hereby incorporated herein by reference in its entirety.

STATEMENT REGARDING FEDERALLY SPONSORED RESEARCH OR DEVELOPMENT

Not Applicable.

FIELD OF THE INVENTION

The present invention relates to a method and an apparatus for the reduction or elimination of the buildup of solids in a system or conduit, such as a conduit for the transport of typical hydrocarbon streams produced from oil or gas wells (mixture of crude oil, condensate, fresh water or brine, natural gas). The invention has special relevance to deep water subsea wells where phase separation and purification is difficult, but is not limited to only deep waters. More particularly, the present invention relates to a method for precipitating solids dissolved in the produced stream, in a treatment apparatus positioned upstream of the system or conduit, as well as precipitating other solids formed when mixed phases are at selected pressures and temperatures. An example of the latter is the creation of solid natural gas hydrates as a mixture of gas and water is cooled under pressure. Further, the present invention relates, but is not limited, to precipitation driven by cooling the stream in the treatment apparatus to or near the ambient temperature surrounding the system or conduit. Still further, the present invention relates to a treatment apparatus including a flow passage having a sufficient size and length to effect precipitation and/or deposition of created solids, and a removal device adapted to remove said solids in a fashion such that they can be transported in the subsequent conduit without flow interruptions.

BACKGROUND OF THE INVENTION

Typically, when crude oil is produced from a reservoir, it contains water, gas, and dissolved solids, such as wax, asphaltene, organic salts, and inorganic salts. Waxes, or high molecular weight paraffins, found in crude oil production systems generally include branched and straight, high carbon number (average carbon numbers of 18+, more particularly 40+) alkane hydrocarbon chains. An alkane is a hydrocarbon molecule having the general empirical formula $C_nH_{2n+2}$, where n, the carbon number, is a positive integer. Asphaltene is defined as the fraction of the crude oil insoluble in n-heptane, but soluble in toluene. Asphaltenes are complex polar macro-cyclic molecules that typically contain carbon, hydrogen, nitrogen, oxygen, and sulphur. The inorganic salts that may be present include any inorganic salt typically present in produced streams and which may precipitate to form salt deposits known as scale. Such inorganic salts include sulfates, for example $BaSO_4$, $CaSO_4$, and $SrSO_4$, and carbonates, for example $CaCO_3$, $MgCO_3$, and $FeCO_3$, in addition to the more common chlorides of sodium, calcium, and magnesium. The inorganic salts that may be present also include silicon oxides, such as $SiO_2$, or more commonly various silicates. A salt generally is an ionic complex between a positively charged cation, for example $Ca^{2+}$, and a negatively charged anion, for example $SO_4^{2-}$. An organic salt is a salt that is a compound of carbon and therefore includes a carbon-containing cation.

Some of these dissolved solids may precipitate as a thermodynamic parameter, such as temperature or pressure, changes. For instance, the solubility of wax decreases with temperature reduction and with pressure reduction, especially if such results in liquid hydrocarbon shrinkage as the lighter components flash to the vapor phase. The "cloud point" of a fluid, also referred to as the "wax appearance temperature" is the temperature at which wax first appears in solid form as the fluid cools. Normally, this data is taken at atmospheric pressure; substantially higher pressures typically require cooler temperatures before precipitation is induced. Similarly, salt solubilities typically decrease with decreasing temperature and decreasing pressure. Asphaltenes form primarily due to a decrease in pressure. When the pressure drops to the bubble point pressure, the asphaltene molecules may precipitate in some systems, typically ones rich in paraffins and poor in resins and aromatics. Further, asphaltene solubility below the fluid bubble point decreases with rising temperature. Sometimes, asphaltene deposition may occur with wax deposition.

Further, some of these dissolved solids may precipitate as chemical composition parameters change, such as composition changes caused by mixing of two or more fluid streams. For example, hydrate, salt, and asphaltene precipitation can also be caused on mixing of two or more streams. For instance, hydrates may precipitate on mixture with fresh water, asphaltene precipitation can be induced by the addition of lower paraffins, multiple brine mixtures can lead to incompatibilities resulting in the precipitation of one or more of the salts.

As indicated previously, the precipitation of solids may also be induced by phase changes of one or more of the fluid components. For instance, water may form ice on sufficient cooling and water and certain light gases may form clathrate hydrates (for example, as described in *Natural Hydrates Of Natural Gases*, E. D. Sloan, Marcel Dekker, Inc. N.Y., 1997) at lower temperatures or higher pressures or a combination of the two effects. Specifically, the lighter gases include the lower hydrocarbon gases with less than 5 hydrocarbons as well as $CO_2$, $H_2S$, $N_2$, and the like. When a flowing stream is cooled below the hydrate dissociation temperature, the temperature, calculated or measured, at a given pressure at which hydrates will dissociate into water and gas, then water present in the system will tend to combine with the light gases to form solid hydrates.

In extracting oil from a reservoir and transporting it, precipitation may. occur at any one of the stages along the flow, including in the formation near the well bore, within the well, and beyond the well, in a conduit or pipeline, especially if the pipelines are multi-phase, cold sub-sea lines. In the formation near the well and at the well bottom, the crude temperature is normally higher than the cloud point or hydrate dissociation temperature, avoiding wax and hydrate precipitation, however, salts and asphaltenes can and have precipitated due to pressure draw down. As the crude oil travels up the well, the temperature and pressure drop, which may cause additional solids precipitation. At the well head, the pressure may be reduced further by a choke to stay within flow line pressure limits (LPL's); the pressure drop across the choke will induce additional cooling (Joule-Thomson expansion) both of which may cause further precipitation of wax, salt, and hydrate. After the choke sub-sea well streams enter multi-phase flowlines for transport to shallow water, surface piercing structures where the streams are separated. The flow in deep water flowlines is further cooled by the cold waters (typically 40 F) surrounding the flowlines.

On the other hand, late in the life of the well, as the depleted field pressure declines, the wellhead pressure may need to be raised by multiphase pumps or other means in order to overcome the hydrostatic pressure resulting from the elevation increase to the host platform. The increased pressure may induce hydrate formation. Beyond the wellhead, with or without increased pressures by artificial compression, the produced fluid has to pass through the flow line or lines, such as tiebacks, to the host facility.

Deep water subsea flowlines are used to transport oil, gas, and aqueous fluids from subsea well(s) to a host facility where the fluids are separated and treated for sale. The flowlines may combine fluids from several wells or even several fields; that is, several different fluids may be mixed. In particular, extended tieback systems are useful for the development of small fields in deep waters, by tying back subsea trees or manifolds that are remote from processing facilities. These deep water flow lines are typically cold, near (rarely below) the freezing point of water.

When the cooling occurs in a flowing pipeline, well or similar conduit, the formation of waxy or paraffinic, hydrate, asphaltic, and salt solids is undesirable, as the solids build up in the conduit by partially depositing onto the walls or settling to the bottom, both of which reduce the flow cross-sectional area, and eventually lead to local spalling of the deposit which tends to plug the pipeline ahead. This can result in shut-in of the line and temporary cessation of well production. A buildup usually is caused by a deposition process where the solids form on the system walls and continue to grow so as to obstruct the system or conduit.

Typically, the solids deposition on the flow line inner wall continues as long as the fluid temperature is greater than the wall "surface" temperature the fluid sees, there is flow, and the pressure is conducive for solid formation. Isothermal conditions do not lead to deposition but still may induce limited solids formation (due to sub-cooling effects) and gravitational drop out when flow is stopped. In general it is recognized that solids that settle as flow is stopped are unlikely to form true deposits but rather tend to be removed as flow is re-initiated. Any buildup of solids reduces the cross-sectional area for flow or the volume of treating vessels, which can lead to reduced throughput and eventual total obstruction. Thus, it is desirable to provide a system or method that assures passage of fluid through a flow line, such as a sub-sea tie-back.

For short tiebacks, such as those less than 15 miles, in deep water (where the ocean temperature is about 40° F.), one approach to flow assurance involves the insulation of twin flow lines to maintain the stream temperature above the cloud point or hydrate formation temperature during normal flow, reduced flow near the project end and in case of shut-ins lasting less than several hours. Twin flowlines are employed to allow round-trip pigging from the receiving facility. This method has the disadvantage that it requires two flowlines and the amount of insulation required increases with increasing length of the pipeline, reduced flow, and account of shut-ins. Thus, this method is economically unfeasible for longer flow lines.

In another technique, chemicals that delay hydrate formation to lower temperatures are injected into the stream. For example, the formation of hydrates can be inhibited thermodynamically at selected, and usually mild, conditions by a variety of alcohols and salts. In yet another technique hydrate and wax deposition onto conduit walls can be avoided by a variety of surface active agents (anti-agglomerants, kinetic inhibitors, surface wetting agents, or nucleating agents). Chemical treatments are generally more expensive in the long run than twin insulated lines, but they can handle any distance tiebacks.

These methods can be used alone, in combination with multiple chemical treatments, or in combination with the use of thermal insulation.

Blocked flowlines require remediation methods. Such methods include, but are not limited to, coiled tubing drilling, jetting, dissolution, as well as thermal treatments (hot oiling or in-situ heat generation), and pressure reduction (for hydrates and wax only) or a combination of such. These same methods are applicable to the present invention in case of some unanticipated failure.

Notwithstanding the teachings disclosed above, there remains a need in the art for an economical and effective system and method for reducing or eliminating build-up of solids in deep water subsea flowlines. The present invention overcomes the deficiencies of the prior art, as will be demonstrated.

SUMMARY OF THE INVENTION

The present invention allows the use of single or multiple, bare or uninsulated flowlines for the evacuation of produced streams from hydrocarbon wells at cold ambient temperatures and high pressures. The invention features a process and apparatus for preparing a stream produced from an oil or gas well for subsea transport in a multi-phase, cold, relatively high pressure uninsulated conduit, including passing the stream through a process and apparatus under conditions sufficient to precipitate and/or deposit solids in the apparatus; removing said solids from the process; suspending the solids in the stream, forming a slurry or otherwise transportable suspension or solids distribution; and passing the slurry/suspension/distribution to a conduit connected to additional processing facilities at substantial distances from the well in a fashion to avoid/reduce plugging of said conduit. The invention is especially applicable to deep water subsea wells, but is not limited to such.

The above mentioned precipitation/deposition is caused by cooling of the stream by the ambient ocean temperature, Joule-Thomson expansion due to pressure losses, mechanically induced cooling (heat pumps, etc.), addition of cooling agents (solid $CO_2$, etc), as well as nucleation inducing agents, or a combination of the above. Discussions of cooling processes for waxy oil are given in U.S. Pat. Nos. 4,697,426 and 4,702,758, both which are incorporated herein by reference.

In another aspect, the present invention features a treatment process and apparatus for precipitating solids dissolved in the stream, or otherwise generated solids by process variable changes, including a flow passage having an outer surface exposed to a lower temperature than the temperature of the stream, an inner surface, and a length sufficient to promote cooling of the stream and precipitation of said solids in the cooled stream or on said inner surface and a removal element adapted to remove at least a portion of said solids from said inner surface or the stream so as to avoid continued solids build-up in the treatment process and eventual plugging of the flow passage or downstream conduit.

Specifically, the present invention features a treatment apparatus for precipitating solids dissolved in the stream, or otherwise induced to precipitate, the stream passing from said treatment apparatus to a flow line, the apparatus including a tubular structure comprising a loop adjacent said flow line and having an inner surface and an outer surface, with the outer surface contacting sea water at a temperature such that the solid precipitates on the inner surface and in the stream. The apparatus further includes a mechanical element adapted to remove said solid from said inner surface and the stream.

More specifically, the above described cooling by the ambient deep water ocean can be augmented by additional cooling methods near the termination of the apparatus to reduce the length or size of the apparatus such as Joule-Thomson cooling, mechanical cooling (heat pumps), or injection of coolants.

Thus, the present invention comprises a combination of features and advantages that enable it to overcome various problems of prior methods. The various characteristics described above, as well as other features, will be readily apparent to those skilled in the art upon reading the following detailed description of the preferred embodiments of the invention, and by referring to the accompanying drawings.

It is understood that throughout this specification flow refers to the net local movement of a portion of a fluid across a notional plane, such as defining a local cross-section of a flow structure, such as a flow line, a pipeline, a flow passage, a tubular structure, and the like.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Subsea Cooling with Continuous Mechanical Solids Removal

Figure 1:
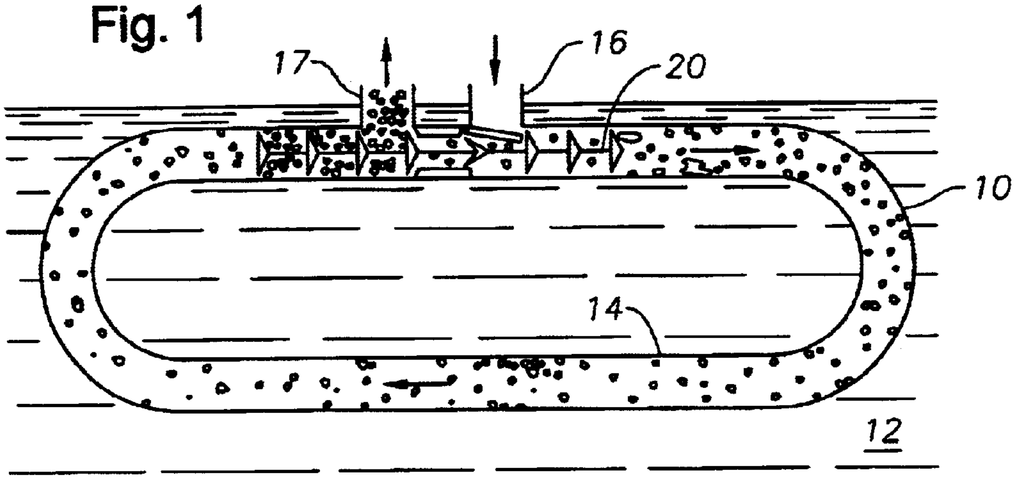
FIG. 1 is a schematic of a preferred treatment apparatus having a loop for use with continuous removal of solids.

Referring to FIG. 1, a preferred treatment apparatus includes a treatment loop 10 that rapidly cools, mixes, or changes the pressure of an incoming fluid stream to conditions equal to or near the desired conditions in the downstream equipment. For example, when the downstream equipment operates at a temperature lower than that of the incoming fluid stream, the treatment loop is used to cool the stream. In this case, the treatment (cooling) can be accomplished through natural convection, forced convection, and/or refrigeration (energy removal). Natural convection is preferred for subsea application. Natural convection induces heat transfer between the hot produced stream and the surrounding seawater 12 by flowing the hot stream through an uninsulated pipe loop and uses the ambient seawater as the cooling medium.

The treatment loop pipe 14 can be provided with features such as fins or the like (not shown) to enhance heat transfer and can be elevated above the sea floor to similarly enhance heat transfer. In addition, the pipe 14 may be configured and oriented in a manner (for example, as a vertical coil), that causes convection currents in the seawater and thus enhances heat transfer between the pipe and the water.

The apparatus preferably includes at least one circulating production stream driven or auxiliary pressure driven device 20, which circulates to accomplish continuous cleaning and slurry production. For example, the circulating device 20 may be a mechanical device that removes any solids formed in the stream or deposited on the inside wall of the treatment loop. A preferred design of the mechanical device is based on the "Moving Element (ME)" concept patented by Enterprise 2000® and disclosed fully in U.S. Pat. Nos. 5,284,581, 5,286,376, 5,427,680, 5,676,848, and 6,070417, all of which are incorporated by reference herein in their entireties. According to these patents, a processing wall is made part of the boundary of a continuous reentrant lumen (a treatment loop), and wall conditioning runners 24 (the mechanical device 20) circulate through this lumen so as to dislodge accumulated material from the processing wall. The runners or shuttles 24 are driven around the loop of the tubular structure by hydraulic forces generated by the fluid introduced into the apparatus via inlet port 16, i.e. the produced stream.

Figure 5:
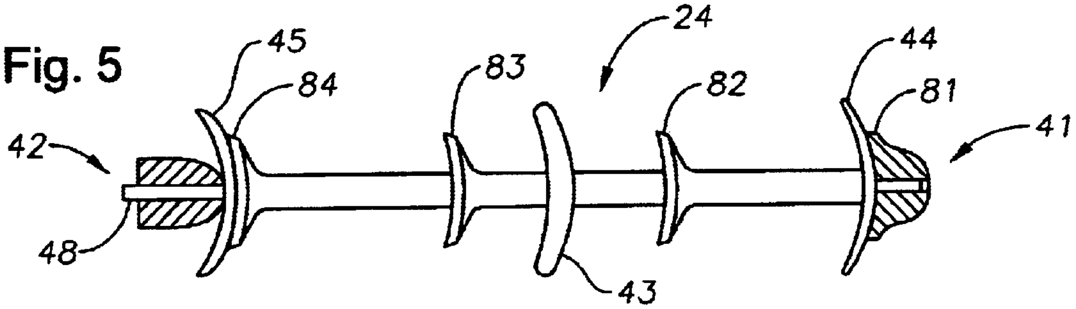
FIG. 5 is an enlarged view of one embodiment of a runner for use in the present apparatus.

As shown in FIG. 5, a preferred runner 24 has an elongated form extending from lead end 41 to rear end 42 and includes a wall conditioning element 43, a lead entrainment element 44, a rear entrainment element 45 and a plurality of return blocking elements 81, 82, 83, and 84 all affixed on flexible spine 48. Spine 48 and the other components of runner 24 are made of deformable or flexible material so that runner 24 can pass through treatment loop 10. The distance between lead entrainment element 44 and rear entrainment element 45 is preferably greater than the shortest distance from inlet port 16 to outlet port 17. In a preferred embodiment, the distance between adjacent return blocking elements is less than the length of reduced portion 30. Runner 24 is preferably free to move independently around the circuit of treatment loop 10.

According to the present invention, runners 24 can alternatively comprise various other devices, including gel pigs, variable diameter tractors or pigs, pumpable brushes and the like.

The above process and apparatus may be enhanced by downstream systems that cool and promote precipitation while shortening the convection cooling section. Among suitable devices are expansion valves leading to pressure reduction and Joule-Thomson cooling, heat pumps or refrigeration, or cooling agent injection.

Subsea Cooling with Intermittent Solids Removal

Figure 2:
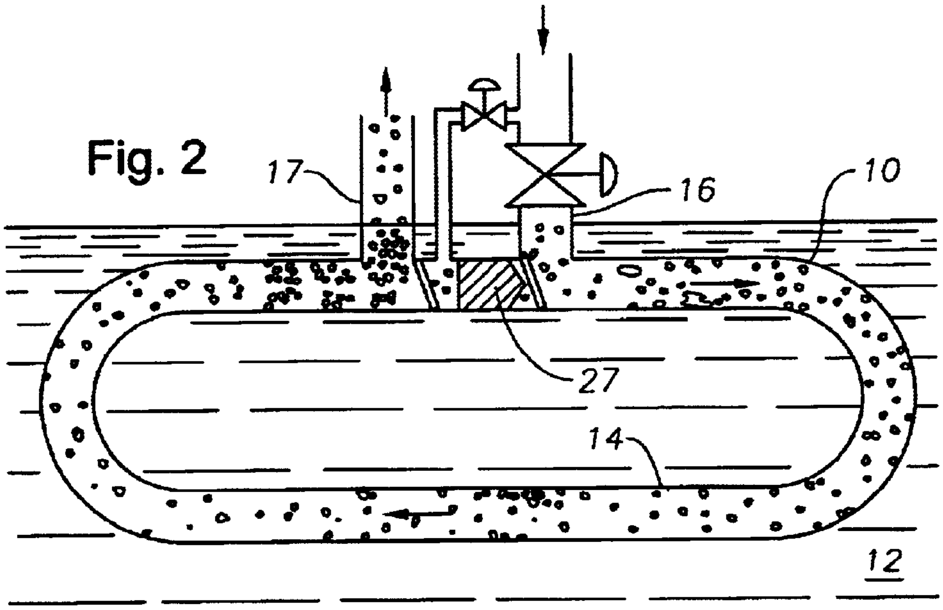
FIG. 2 is a schematic of an alternative preferred treatment apparatus having a loop for use with intermittent removal of solids.

Referring now to FIG. 2, in an alternative preferred embodiment, the treatment apparatus is similar to the treatment loop shown in FIG. 1 and also employs circulating devices 20, except that the circulating device 20 is a modified pig 27 launched by two or more actuator valves, instead of a continuously circulating runner. The apparatus includes production stream or auxiliary pressure driven devices with automated valving to accomplish intermittent cleaning and slurry production. Software systems for optimizing pigging frequency are known in the art.

Figure 7:
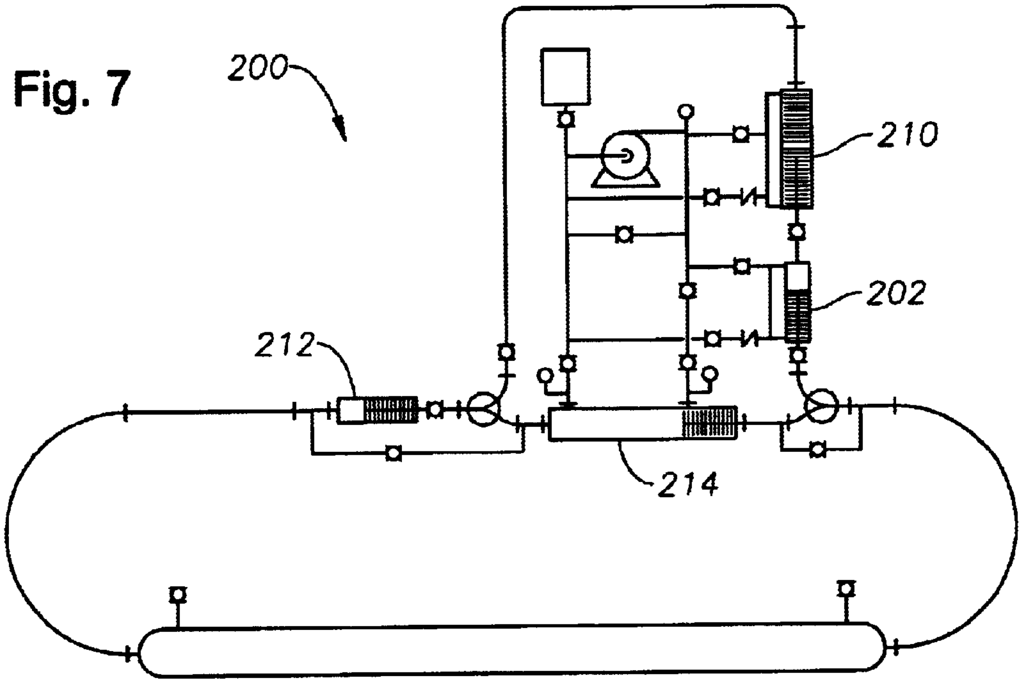
FIG. 7 is a schematic of one embodiment of a subsea pig launcher in accordance with the present invention.

A preferred embodiment of this system includes a subsea system for launching the circulating device(s) 20 and retrieving worn circulating device(s) 20. An example of a suitable subsea launch/retrieve system 200 is shown in FIG. 7, and includes a launch port 202, a docking port 210, a device stopper 212, and a working section 214. The passage of circulating device(s) 20 through the system is controlled by a plurality of valves, which in turn can be remotely controlled. System 200 can be used to accomplish the replacement of the circulating device(s) 20 in the treatment loop 10 without use of divers and/or remote operated vehicles (ROVs). Several replacement devices 20 can be stored in a subsea magazine, which can be replaced when necessary by use of ROV. Such arrangement will extend the intervention time, reduce use of ROV's and reduce loss of production.

Subsea Cooling High Shear Heat Exchanger

Figure 3:
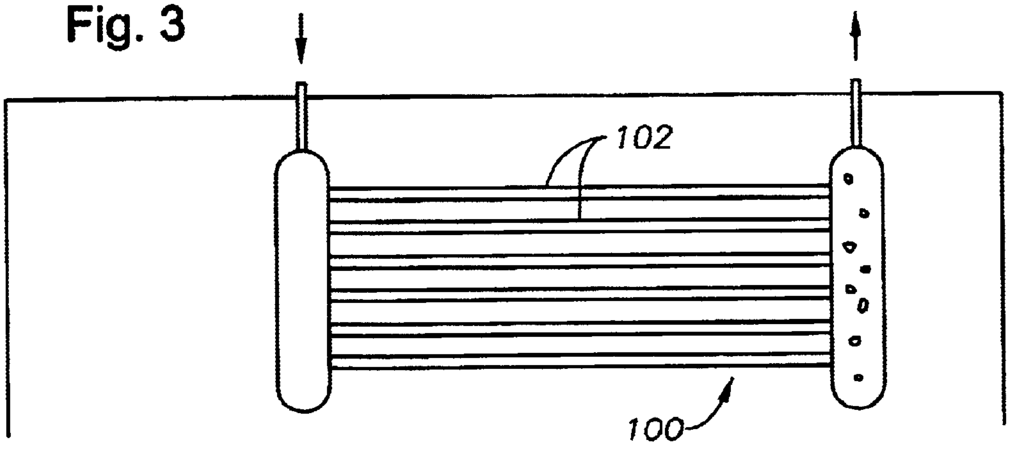
FIG. 3 is a schematic of still another preferred treatment apparatus using a high shear heat exchanger.

Referring to FIG. 3, still another preferred embodiment is based on a rapid cooling, high velocity, high shear rate subsea heat exchanger system. The high shear rate (high flow velocity) in the heat exchanger tubes 102 removes the wax/hydrate deposits from the inside walls of the tubes. According to this embodiment, the treatment loop includes production stream or auxiliary pressure employed to create extremely high continuous velocities, which in turn cause shear stresses that remove the deposits.

Subsea Cooling with Mechanical Deposit Removal

Figure 4:
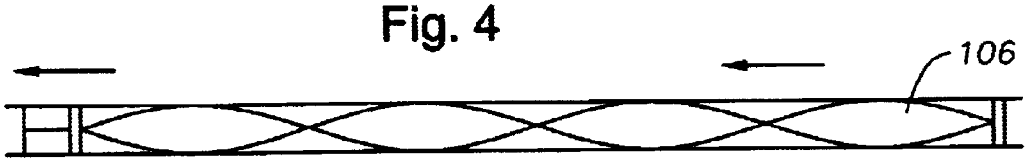
FIG. 4 is a schematic of yet another preferred treatment apparatus involving mechanical removal of deposits by helical vanes.

Referring now to FIG. 4, yet another preferred embodiment of the treatment apparatus includes a mechanical scraping device driven by production stream pressure or auxiliary energy. For example, the treatment apparatus and method may be based on at least one continuously or intermittently rotating and scrapping internal vane 106, helical or otherwise, or an external rotating stream containing device. Each device may be driven by the internal flowing hydraulic forces or by external "energy addition" device such as a motor. The concept may include but is not limited to improved heat exchanger designs discussed in U.S. Pat. Nos. 5,103,368, 4,848,446, 4,641,705, 4,058,907 and 3,973,623, each hereby incorporated herein by reference in its entirety.

Induced Pressure Surges

Still yet another preferred embodiment of a treatment method includes intermittent release of pressure surges that are at or near sonic conditions and aid in the release of the deposited solids that are attached to the sides of the conduit. The base idea for this embodiment is that deposits or build-ups include actual solids, intermixed with liquids such as oil and water, as well as pockets of trapped gas. In this embodiment the deposited solids are spalled off the walls or re-suspended from the bottom of the system by the passage of pressure surges through the treatment apparatus. Both positive and negative pressure surges are useful in this context. Positive surges compress the deposits, including gas, which may cause fractures in the solid encompassing the gas. Similarly, reduced pressure surges expand the gas, which also may cause fractures in the solid matrix. The surge thus either increases and then lowers the pressure along the treatment apparatus (positive pressure surge) or decreases and then increases pressure (negative pressure surge). These variations in pressure, causing corresponding variations in deposit consistency and integrity are expected to result in the desired spalling action.

The pressure surges are preferably induced by bypassing the usual well head choke with limited and intermittent flow releases (resulting in a high pressure surge), intermittent flow restrictions after the choke (low pressure surge), booster pump charging of high pressure chambers which are released periodically to the treatment apparatus (high pressure surge). The charging can be achieved by production stream pressure or external power driven booster pumps. The size of the chamber can be optimized in terms of size, pressure rise, release frequency, cost, and surge effect.

"Water Hammer" Effects for Removing Deposits.

Still another alternative preferred embodiment of a treatment method includes interrupting the production stream, more severely than in the above negative pressure surge example, supported by a booster pump or not, to create "water hammer" surges to dislodge deposits. "Water hammer" is the effect created when a flow is suddenly stopped. At the initiation point of the stoppage such a stoppage creates a severely reduced pressure due to the momentum of the flowing fluid continuing to move away from the stoppage. The more familiar part of "water hammer" is the stoppage of flow down stream where the flow is indeed stopped. The momentum of the fluid continues and builds high pressures at the stoppage. A method according to the present embodiment involves employing the sudden stoppage of flow into the apparatus to generate low pressures that will expand the gases and liquids coexisting with the deposits so as to cause their spalling. The stoppage can be cause by any device that interrupts the produced flow. Surge chambers downstream of the apparatus and its flow control device can alleviate the attendant reduction in production rates.

System Apparatus

Each of the above-described embodiments of the present invention involves the reduction solids buildup and deposition in a flow line by forcing the precipitation to occur upstream, in a treatment apparatus. The treatment apparatus ensures that the precipitate is formed in the apparatus, produces small precipitate particles that either stay suspended in the fluids or are easily dispersible by flow or agitation, and most importantly, do not tend to stick to solid surfaces or to each other so as to cause agglomeration. This avoids downstream deposition and buildup. The apparatus is positioned upstream of the system or conduit where deposition and buildup would normally occur. The fluids preferably pass from the apparatus directly to the system or conduit or conduits in question.

A treatment apparatus according to the present invention preferably includes at least one flow passage of specifically selected length and size so as to induce all or most of the dissolved solids to precipitate within it. A flow passage according to the present invention is adapted for the flow of fluid through the flow passage and includes a wall-defining interior containing the stream. A preferred configuration of the flow passage is a tubular structure due to construction costs and ease of operation. The flow passage according to the present invention returns the discharge to near the entry point, such as in a loop configuration, or to a manifold miles away accepting several treated streams for further transport in an expanded flowline. A flow passage according to the present invention may be constructed in any suitable manner that permits the application of a driving force for precipitation of solids within the flow passage. The driving forces for solid precipitation or creation (thermal, pressure, or composition) are concentrated within the apparatus so as to eliminate/reduce further solids creation after the flow passage. Some of the solids induced to form in the apparatus will deposit on the containing walls of the apparatus. These deposits are removed from the walls by means offered in the present invention, and dispersed in the fluids as small particles that are inert and do not stick to themselves or any surface.

As will be appreciated by one of ordinary skill in the art, a suitable length of a flow passage sufficient to effect substantially complete deposition of the dissolved solids within the flow passage according to the present invention will depend on a variety of factors affecting the driving force for precipitation of dissolved solids, such as the temperature of the ocean environment, the chemical composition of the crude oil, the temperature and pressure of the crude oil at the entrance to the flow passage, and the like. A determination of the appropriate length for a particular application is within the skill of one of ordinary skill in the art.

The system and conduits addressed by the present invention include all conduits that convey fluids from one or more points to one or more destinations as well as storage and processing vessels or systems that contain the fluids. Typical conduits are pipelines, risers between the ocean floor and the ocean surface equipment, subsea pipelines, flexible pipelines or hoses, conduits of other than circular circumference, oil or gas wells, etc. Systems typically will include pressured or non-pressured storage vessels, processing vessels such as two-phase (gas-liquid) or three-phase (gas-water-liquid hydrocarbon) separators, dehydration equipment such as chem-electrics or glycol contactors, etc. The present invention preferably includes a system and method for the prevention or reduction of wax, hydrate, asphaltene, and organic and inorganic salt deposition or buildup in deep water subsea flowlines.

The precipitation within the apparatus is induced by thermal, pressure, or chemical composition change effects. Wax or paraffin precipitation is most easily caused by cooling the paraffin saturated stream. Clathrate hydrate precipitation is most easily caused by cooling or compression of the appropriate stream. Salts are most easily precipitated by cooling. Asphaltenes below the fluid bubble point are most easily precipitated by addition of light paraffins or by cooling. All of the above precipitation processes are dependent on temperature, pressure, and composition to various degrees. In the present invention, the fluid is cooled, increased or decreased in pressure, or modified in composition as it flows through the present apparatus. The apparatus may be downhole, at the well head, at the well head after the well head choke or multiphase (or other) compression. At the inlet to the device, the conditions of the flowing fluid are outside the range of solid formation conditions. As the conditions change within the apparatus in a controllable and predictable fashion, solids will form, part of which will deposit or fall out or build up in any other fashion in the apparatus. The apparatus is designed such that fluid exiting from it is below or near the downstream conditions.

Figure 6:
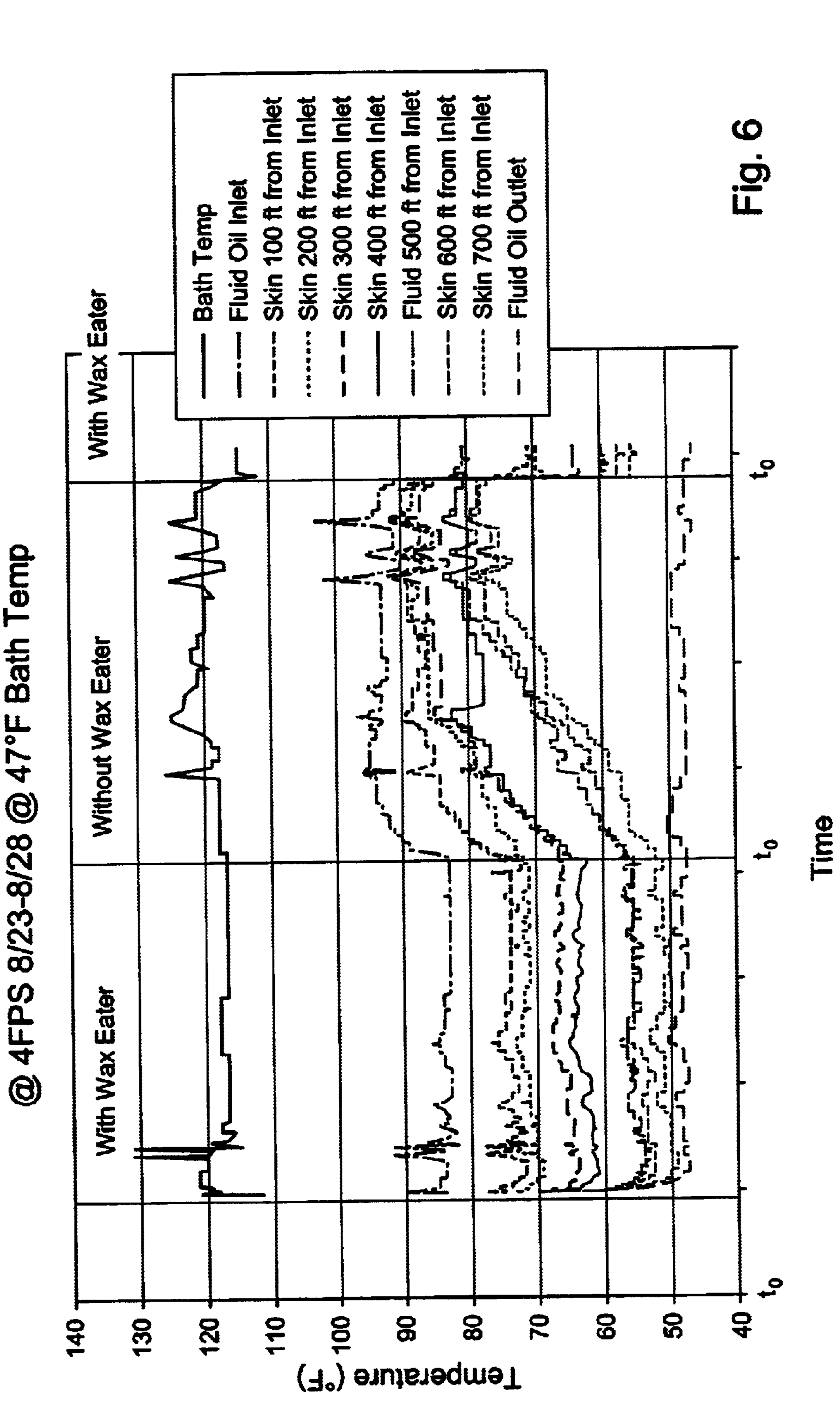
FIG. 6 is a plot showing temperature v. time for a system containing one embodiment of the present invention.

The efficacy of the present invention is demonstrated by FIG. 6, which is a plot showing the temperature versus time inside a treatment loop. When the solids removal system is operating, from $t_0$ to $t_1$, the skin temperature reaches an equilibrium level that depends on the distance from the fluid inlet. When the solids removal system is not operating, from $t_1$ to $t_2$, the temperature at the lumen wall immediately begins to rise, indicating an accumulation of solids on the inside of the wall. When the solids removal system is switched back on, at $t_2$, the temperature quickly returns to its equilibrium level.

This invention eliminates/minimizes the driving force for solids creation subsequent to the apparatus, thereby eliminating/reducing chances of solid formation in the subsequent systems. As a result the fluid exiting the invention will contain solids dispersed within said fluid in the form of a slurry of liquid hydrocarbon, gas, water (if the conditions are above the hydrate dissociation temperature at the given pressure, and solids (wax, salt, aspahaltenes, and possibly hydrates). In particular this invention eliminates or reduces the need for chemical injection and/or eliminates the need for insulated flowlines(s), both of which are costly. An advantage of the present invention is that deepwater extended tiebacks employing the present invention make production of oil and gas from remote deepwater reservoirs economical where present systems are not.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims. The sequential recitation of steps in a claim is not intended to require that the steps be performed sequentially, unless expressly so stated. Hence, steps can be performed sequentially, continuously, simultaneously, or intermittently, without limitation.

What is claimed is:

1. A method for a treating hydrocarbon well stream that is initially at a first temperature and first pressure, the stream containing components that tend to form solids upon cooling, depressurization, or mixing with other streams, such that the stream is rendered suitable for transport or processing at second conditions comprising a second temperature and a second pressure, at least one of said second temperature and said second pressure being less than said first temperature or said first pressure, the method comprising:

(a) passing the stream through an apparatus under conditions so as to promote formation of substantially all solids that would otherwise precipitate downstream at said second conditions so as to form solids and a treated liquid that is substantially free of liquid components that would otherwise precipitate at said second conditions;

(b) suspending the solids in the treated liquid by rotating a helical coil in contact with the solid so as to form a solids-containing liquid stream: and (c) transporting the solids-containing liquid stream.

2. The method of claim 1 wherein said apparatus consists of a singular or plural, parallel tubular structure.

3. The method of claim 1 where the tubular structure is surrounded by the ambient ocean waters.

4. The method of claim 1 where the tubular structure is a generally recognized loop or loops from the source of the stream with a return back to near its source before entry into the conduit or facility.

5. The method of claim 1 where the tubular structure provides a connection between the source and a second apparatus.

6. The method of claim 1 wherein the tubular structure comprise; a coil of a diameter 10 to 200 times the internal diameter of the tubular device and the axis of the coil, generally perpendicular to the plane of the coil elements, is preferably vertical, but can be at any other angle from vertical up to 90 degrees.

7. The method of claim 1, further including Joule-Thomson cooling, creating an additional 2 to 4° F. cooling beyond the apparatus of claim 1.

8. The method of claim 1 where the apparatus of claim 1 further includes a heat-pump or refrigeration type cooling allowing controlled and unlimited additional cooling of the stream.

9. The method of claim 1, further including injecting of chemical agents capable of creating cooling allowing controlled and unlimited additional cooling of the stream.

10. The process of claim 1 wherein solids removal is effected by a system that comprises passing a scraping device through said loop, said scraping device having an uncompressed lateral dimension equal to from about 0.9 to about 1.1 times the inside diameter of the apparatus.

11. The process of claim 1 wherein solids removal is effected by a system that comprises circulating a scraping device with a frequency that is controlled automatically by stream production rates or by predetermined and controlled rates.

12. The method of claim 11, further including actuating said scraping device with a controlled valve or valves.

13. The method of claim 11 wherein the scraping device comprises a shuttle passing said loop continuously, only controlled by flow.

14. The method of claim 1 wherein precipitating solids are subjected to normal and shear forces caused by pressure waves within the oil.

15. The process of claim 1 wherein step (b) is continuous and simultaneous with step (d).

16. The process of claim 1 wherein step (b) is intermittent.

17. The process of claim 1, wherein step (b) comprises forming particles of solid.

* * * * *